US010021354B2

(12) United States Patent
Haas

(10) Patent No.: US 10,021,354 B2
(45) Date of Patent: Jul. 10, 2018

(54) ELECTRIC VEHICLE CHARGING STATION WITH INTEGRATED CAMERA

(71) Applicant: Siemens Industry, Inc., Alpharetta, GA (US)

(72) Inventor: Harry Price Haas, Atlanta, GA (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 185 days.

(21) Appl. No.: 15/045,994

(22) Filed: Feb. 17, 2016

(65) Prior Publication Data
US 2017/0237944 A1 Aug. 17, 2017

(51) Int. Cl.
H04N 7/18 (2006.01)
H04N 5/225 (2006.01)
G06K 9/00 (2006.01)
H04N 5/77 (2006.01)
G06Q 20/14 (2012.01)
B60L 11/18 (2006.01)

(52) U.S. Cl.
CPC .......... *H04N 7/183* (2013.01); *B60L 11/1816* (2013.01); *B60L 11/1825* (2013.01); *B60L 11/1846* (2013.01); *B60L 11/1848* (2013.01); *G06K 9/00885* (2013.01); *G06Q 20/14* (2013.01); *H04N 5/2252* (2013.01); *H04N 5/772* (2013.01); *B60L 2230/00* (2013.01); *B60L 2230/16* (2013.01); *B60L 2270/30* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
CPC .......................... H04N 5/2252; B60L 2230/16
See application file for complete search history.

(56) References Cited

U.S. PATENT DOCUMENTS

| 2011/0213656 A1* | 9/2011 | Turner ...................... B60L 3/12 705/14.49 |
| 2014/0002018 A1 | 1/2014 | Montemayor et al. |
| 2014/0067493 A1* | 3/2014 | Turner .................... G07B 15/02 705/13 |
| 2014/0067660 A1 | 3/2014 | Cornish |

(Continued)

FOREIGN PATENT DOCUMENTS

CN 203658809 U 6/2014
EP 2549618 A2 1/2013

*Primary Examiner* — William C Vaughn, Jr.
*Assistant Examiner* — Jerry Jean Baptiste

(57) ABSTRACT

An electric vehicle charging station such as a smart Electric Vehicle Supply Equipment (EVSE) with an integrated camera is provided. A networked on-charging station camera unit disposed either internally to the smart EVSE or connected externally on the smart EVSE. The camera unit includes at least one of a video camera and a still image camera. A communication module is coupled to the camera unit to communicate acquired camera data over a camera connection to a server or to a mobile device of a user over one or more public networks, one or more private networks, or a combination of one or more public networks and one or more private networks.

16 Claims, 4 Drawing Sheets

(56) References Cited

U.S. PATENT DOCUMENTS

2014/0327556 A1* 11/2014 Reddy .................. B60L 11/1818
340/901
2015/0022663 A1* 1/2015 Wang .................... B60R 25/102
348/148
2015/0224888 A1   8/2015 Wild et al.

* cited by examiner

- 405: Storing the EVSE usage information at the smart EVSE
- 410: Reporting the EVSE usage information via the communications network based on the stored authentication information and information acquired from the camera

ELECTRIC VEHICLE CHARGING STATION WITH INTEGRATED CAMERA

BACKGROUND

1. Field

Aspects of the present invention generally relate to electric vehicle charging stations and more specifically relates to smart electric vehicle charging stations with integrated camera operations.

2. Description of the Related Art

Electric vehicle charging stations such as smart electric vehicle charging stations are rapidly growing in popularity. More features are being incorporated into electric vehicle charging stations. For example, there are now messaging enabled electric vehicle charging stations that have built-in-communication modules. Such electric vehicle charging stations allow wireless communications of charging data to a server over a network.

Conducting monetary transactions through mobile devices is known. Human sale points allow customers to purchase products and services using the customers' financial information. For example, credit card based monetary transactions may be carried out by systems that can either read data from a magnetic strap attached to the card enabling the system to read details of the card for identification or by mechanically inputting the card number and other card details such as the name of the card owner and the expiry date of the card, which are usually printed or engraved on one surface of the card as well as the Card Verification Value Code (CVV or CVC) which is usually printed or engraved in the back surface of the card. However, electric vehicle charging stations cannot be used for conducting or managing such monetary transactions using customers' financial information.

With a perceived need for increased security and surveillance, many parking lot owners and homeowners have installed alarm systems, including some with passive infrared motion sensors. However, despite the availability of a wide variety of monitoring systems, there is still a need for improvements in this field of technology.

Typically, user identification for monetary transactions has been addressed through card readers. Tamper deterrence has been addressed through physically securing devices. Physical security and monitoring has been addressed through use of a separate security system. However, multiple functionality gaps exist in electric vehicle charging stations. Some of these gaps involve user identification, tamper deterrence, physical security of a parking lot and home garage security and monitoring.

Therefore, there is a need for improvements to user identification, tamper deterrence, physical security of a parking lot and home garage security and monitoring through electric vehicle charging stations.

SUMMARY

Briefly described, aspects of the present invention relate to an electric vehicle charging station including built-in-cameras to allow video and pictures taken by the camera to be transmitted to a server or a mobile phone and stored on the electric vehicle charging station and processed locally as camera or image data for performing various camera functions such as authentication, security monitoring, motion detection etc. In particular, authentication information may be received at the electric vehicle charging station and compared to acquired camera or image data for user identification or payment authentication. The electric vehicle charging station usage information may be stored and communicated based on the authentication information and the acquired camera or image data to a server via a communications network. For example, electric vehicle charging station usage information may include a specific time when the electric vehicle charging station is used and an amount of energy used at the specific time. In this way, user identification, tamper deterrence, physical security of a parking lot and home garage security and monitoring may be done through an electric vehicle charging station of the present invention by using one or more cameras. One of ordinary skill in the art appreciates that such a camera system can be configured to be integrated in different environments where security, monitoring, identification or authentication is needed, for example, in a parking lot and a home garage installations of the electric vehicle charging station.

In accordance with one illustrative embodiment of the present invention, a smart Electric Vehicle Supply Equipment (EVSE) is provided. The smart EVSE comprises a networked on-charging station camera unit disposed either internally to the smart EVSE or connected externally on the smart EVSE. The camera unit may include at least one of a video camera and a still image camera. The smart EVSE may further comprise a communication module coupled to the camera unit, the communication module is configured to: (i) communicate acquired camera data over a camera connection as private communications to a server over a Local Area Network or a mobile device of a user over a cellular network, (ii) communicate the acquired camera data to the server or the mobile device of the user over a public network infrastructure by connecting to Internet or a networked communications system, or (iii) communicate the acquired camera data to the server or the mobile device of the user over a combination of one or more public networks and one or more private networks.

In accordance with another illustrative embodiment of the present invention, a smart Electric Vehicle Supply Equipment (EVSE) is provided. The smart EVSE comprises a body having an exterior surface and a camera unit integrated with the body. The camera unit has a camera disposed on the exterior surface. The camera is communicatively coupled to a server via a communications network. The camera unit includes a processor configured to receive authentication information of a user of the smart EVSE over the communications network and a storage device configured to store the authentication information locally at the smart EVSE and store EVSE usage information. The processor may be configured to compare the stored authentication information with information acquired from the camera to ascertain an identity of the user of the smart EVSE.

In accordance with yet another illustrative embodiment of the present invention, a method is provided. The method includes integrating a camera with a body of a smart Electric Vehicle Supply Equipment (EVSE), communicatively coupling the camera to a server via a communications network, acquiring information from the camera, receiving authentication information of a user of the smart EVSE over the communications network, storing the authentication information locally at the smart EVSE and comparing the stored authentication information with the information acquired from the camera to ascertain an identity of the user of the smart EVSE.

DETAILED DESCRIPTION

To facilitate an understanding of embodiments, principles, and features of the present invention, they are explained hereinafter with reference to implementation in illustrative embodiments. In particular, they are described in the context of providing a camera unit operable to capture, store, transmit video and still images and provide image data for the video and still images for use in user identification, payment authentication, and security monitoring etc. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

A camera system is provided for an electric vehicle charging station such as a smart Electric Vehicle Supply Equipment (EVSE). The system comprises an enclosure for mounting a camera unit on an exterior surface of a body of the smart EVSE. The camera unit may include a video camera and/or a still image camera. The smart EVSE includes a communication module coupled to the camera unit. The communication module is configured to communicate acquired camera data over a camera connection to a server or a mobile device over a public network, a private network or a combination of both. The smart EVSE includes a processor communicatively coupled to the camera unit. The smart EVSE further includes a media storage device to store the acquired camera data and store EVSE usage information.

Accordingly, means of integration of a still and/or video camera with a smart EVSE are provided. The camera may be provided internally to the smart EVSE or connected externally. The smart EVSE also provides means of communications of the camera information. A camera connection to a server or a mobile device may enable private communications to a specific point or public infrastructure may be used to connect the camera data to the Internet or other networked communications system.

Figure 1:
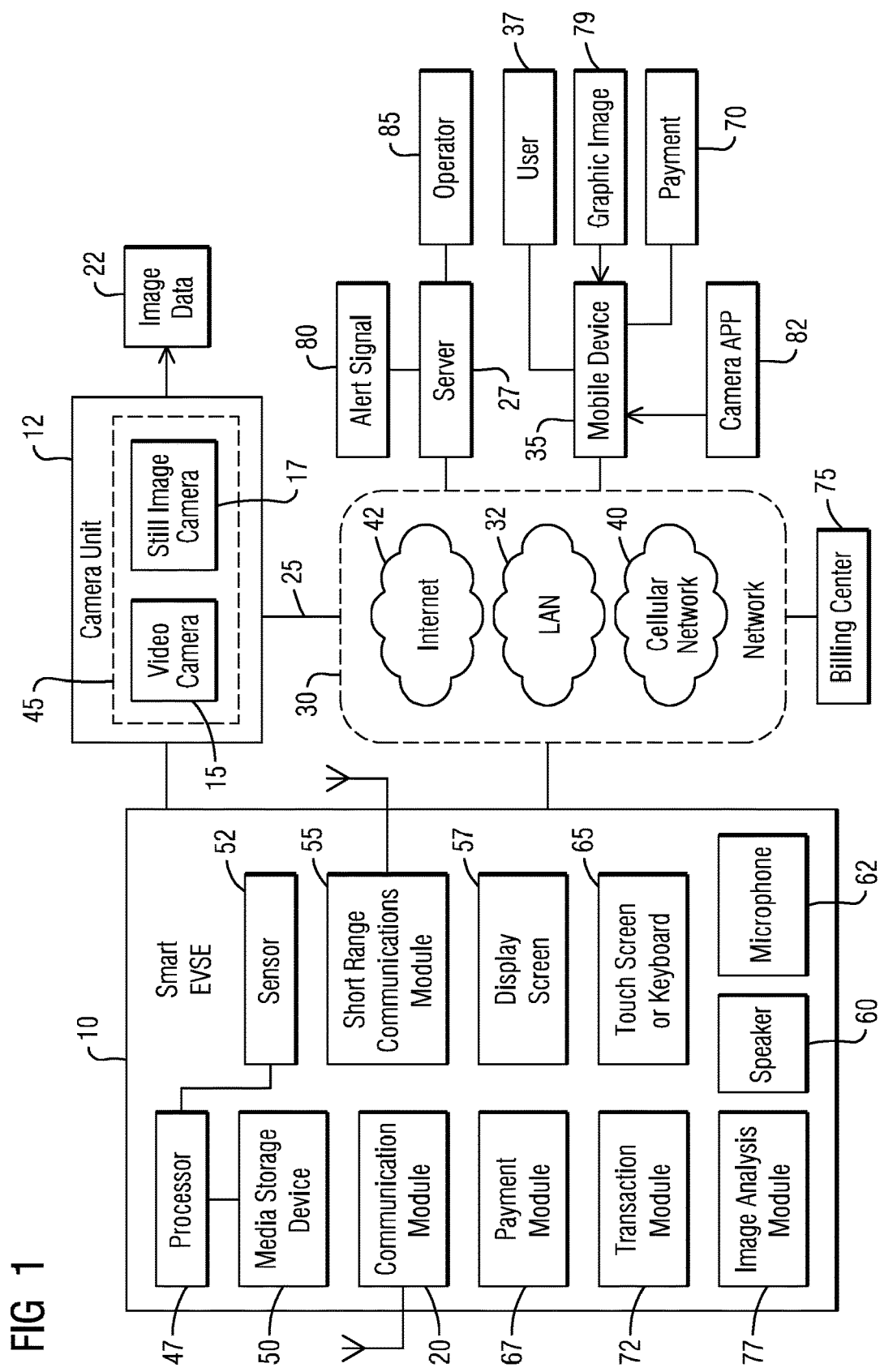
FIG. 1 illustrates a schematic diagram of a smart Electric Vehicle Supply Equipment (EVSE) including a camera unit in accordance with one illustrative embodiment of the present invention.

FIG. 1 illustrates a schematic diagram of a smart Electric Vehicle Supply Equipment (EVSE) 10 including a networked on-charging station camera unit 12 in accordance with one illustrative embodiment of the present invention.

The networked on-charging station camera unit 12 may be disposed either internally to the smart EVSE 10 or connected externally on the smart EVSE 10. For example, the networked on-charging station camera unit 12 may include a built-in video camera 15 and/or a built-in still image camera 17. The smart EVSE 10 allows pictures taken by the built-in-cameras to be displayed on a screen and stored on the smart EVSE 10 and wirelessly or otherwise transmitted as digital photos or digital video files.

As used herein, the "camera unit" refers to a camera, as described herein, which corresponds to digital photography and audio, video recording. The "camera unit," in addition to the exemplary hardware description next, refers to a device that is configured to take still pictures, record, stream, store, download and upload videos and audio. The "camera unit," may be capable of operating in multiple modes such as a still camera configuration mode and/or a video camera configuration mode. The "camera unit" may be rated for high reliability operation in the most extreme outdoor environments.

Examples of the networked on-charging station camera unit 12 include an IPix 2.2 mega pixel 180° command view dome camera which is compatible with normal light conditions. In yet another embodiment, an AXIS-2420 infra-red camera, an IQI3-603 3.3 mega pixel camera and a BOSCH auto-track camera for motion tracking may be used for low light applications. A person skilled in the pertinent art would appreciate that other suitable cameras may be readily deployed based on a specific implementation without departing from the scope of the present invention.

Examples of the built-in video camera 15 include a video recorder that may be a high definition (HD) video recorder capable of recording 1080p and/or 720p video at 30 frames per second. The video recorder may alternatively be a standard definition video recorder limited to recording in lower resolutions, such as a video graphics array (VGA) resolution of 640×480. The video recorder may be provided by Premier, Chicony, Ability, Foxlink, IAC, or the like. A person skilled in the pertinent art would appreciate that other suitable video recorders may be readily deployed based on a specific implementation without departing from the scope of the present invention.

The built-in video camera 15 may be coupled with other electronic components to provide streaming of image data from a video recorder to a wireless data connection, such as Bluetooth, WiFi, and/or a cellular data connection. For example, the built-in video camera 15 may be coupled to a graphics processor, a microprocessor, and a communications module. Either video or images may be transmitted from the built-in video camera 15 to the communications module.

While particular embodiments are described in terms of the networked on-charging station camera unit 12 as the built-in video camera 15 and/or the built-in still image camera 17, the techniques described herein are not limited to still or video cameras but can be also used with other cameras, such as different types of infra-red, and/or night-vision cameras could be deployed.

The smart EVSE 10 may further include a communication module 20 coupled to the networked on-charging station camera unit 12. The communication module 20 may be configured to communicate acquired camera or image data 22 over a camera connection 25 as private communications to a server 27 over a network 30 such as a Local Area Network (LAN) 32 or to a mobile device 35 of a user 37 over the network 30 such as a cellular network 40.

The server 27 may be an EVSE server or a server that is specifically configured for payment or security. The acquired camera or image data 22 may reach the server 27 by way of public networks, private networks, or a combination of both. The image data, or information derived from the acquired camera or image data 22 may be (but is not required) made available to the users' mobile device 35 or other computing device over the network 30. The server 27 may store and report EVSE usage information associated with the information derived from a local camera such as the built-in video camera 15 and/or the built-in still image camera 17 via the network 30.

Alternatively, the communication module 20 may be configured to communicate the acquired camera or image data 22 to the server 27 or the mobile device 35 of the user 37 over a public network infrastructure by connecting to Internet 42 or a networked communications system (not shown). Alternatively, the communication module 20 may be configured to communicate the acquired camera or image data 22 to the server 27 or the mobile device 35 of the user 37 over a combination of one or more public networks such as the Internet 42 and one or more private networks such as the LAN 32 or the cellular network 40.

The smart EVSE 10 may further include a processor 47 communicatively coupled to the networked on-charging station camera unit 12. The networked on-charging station camera unit 12 may be operable to capture, store, transmit video and still images and provide the acquired camera or image data 22 for the video and still images to the processor 47. The processor 47 may process the digital photos or digital video files to detect motion from the acquired camera or image data 22.

According to one exemplary embodiment, the processor 47 used may be rated for a minimum of 1 GHz of processor power. Typically, 1 GHz processors are easily able to perform the multiple tasks needed to acquire and store images while performing many other critical functions such as data encryption, storage, replication, and transmission. The processor 47 has the capability to process and archive all alarm/photographic data, and to store the data in secured, removable and non-removable media for redundancy.

In one example of video transmissions, data may be streamed from the networked on-charging station camera unit 12 at high definition in a 220 Mbps stream with a resolution of 1280×720 to a graphics processor (not shown). The graphics processor may encode and scale the video data into a particular video format, such as an H.264 video stream, and scale the video into a 0.5 Mbps stream with a resolution of 480×360. The encoded and scaled video stream from the graphics processor may be transmitted to the processor 47, which packages the data for transmission through the communication module 20.

According to one embodiment, the communication module 20 transmits the data to the server 27 through a cellular data connection. According to another embodiment, the communication module 20 transmits the data to another device (not shown), which then transmits the data to the server 27. An audio recorder coupled to the processor 47 may be sampled nearly simultaneously with the encoded and scaled video stream by the processor 47 and combined to generate an audio and video data stream.

Figure 5:
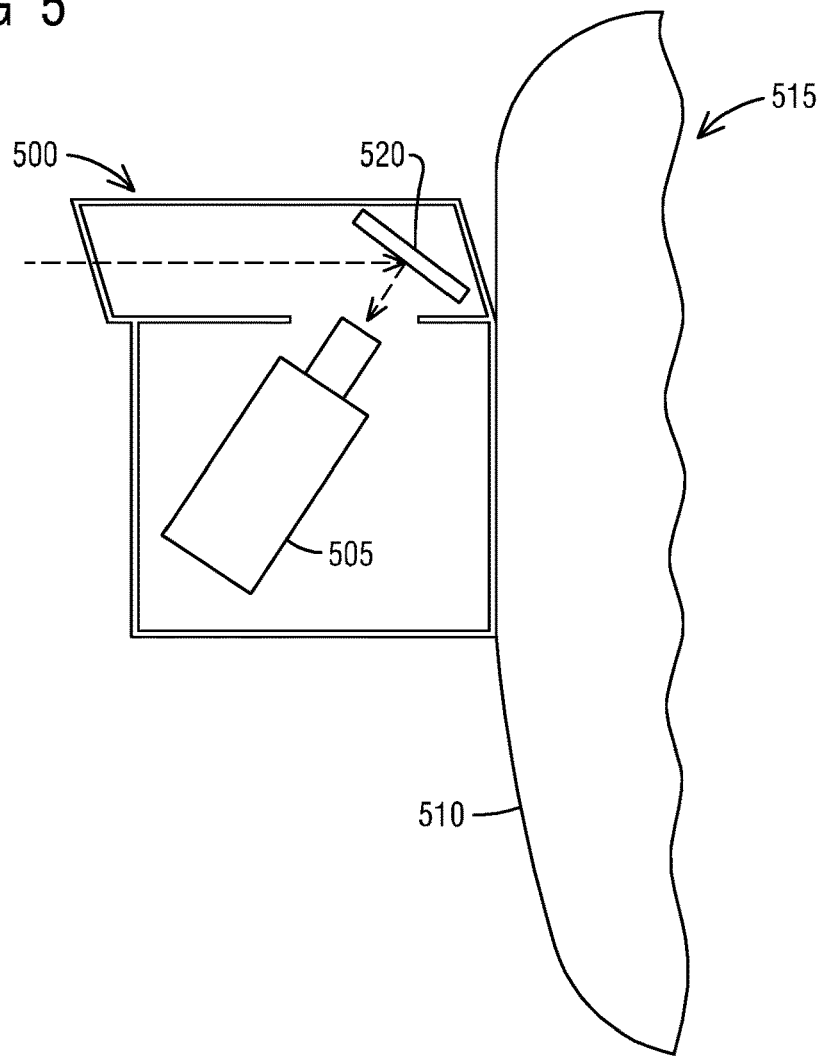
FIG. 5 illustrates a schematic diagram of an enclosure that is tamper resistant and houses a camera in accordance with one illustrative embodiment of the present invention.

The smart EVSE 10 may further include an enclosure 45 that is tamper resistant (see FIG. 5 for details). The enclosure 45 may be configured to house the built-in video camera 15 and/or the built-in still image camera 17 of the networked on-charging station camera unit 12.

In one embodiment, a power system for the networked on-charging station camera unit 12 may be a 12 Volt 5 Amp AC-DC power converter. This power converter may be supplied power via a 120 VAC wall outlet or through a battery/charging system.

The smart EVSE 10 may further include a media storage device 50 to store the acquired camera or image data 22 and store EVSE usage information including a specific time when the smart EVSE 10 is used and an amount of energy used at the specific time. The media storage device 50 may enable an offline operation of the smart EVSE 10. The media storage device 50 may be either a flash memory drive or fixed flash memory media.

For example, 2.5" and 3.5" Flash Memory Drives (FMD's) are currently available with a storage capacity of up to 528 Gbytes. A 528 Gbytes FMD would be capable of storing data at a typical write rate and JPEG picture file size every minute, 24 hours a day, 365 days a year. Alternatively, Solid-State Hard Drives up to 4 Tbytes may be used for bigger needs of storage capacity.

All data collected from the networked on-charging station camera unit 12 is stored on the media storage device 50. The networked on-charging station camera unit 12 may be powered from the smart EVSE 10 through a power supply point on the smart EVSE 10 and transfer all data through a network switch to the smart EVSE 10.

All data collected from the networked on-charging station camera unit 12 may be stored encrypted on the media storage device 50. The encrypted data may be transferred to a local computer via VPN/Firewall that is connected to an uplink port on the network switch. All data transfers into and from the camera system may go through the VPN/Firewall.

In another example, the acquired camera or image data 22 from the built-in video camera 15 may be stored in the media storage device 50. When storing video in the media storage device 50, a user may be able to select between several options for quality of video recorded in the media storage device 50. The quality options may include, for example, a selection between high definition and standard definition recording. The standard definition option may store video at a resolution of 480×360. When storing data in standard definition, data may be stored through a similar process described above for streaming standard definition video, except the data is passed from the processor 47 to the media storage device 50.

When storing the acquired camera or image data 22 in high definition, data may be streamed from the built-in video camera 15 at high definition in a 220 Mbps stream with a resolution of 1280×720 to a graphics processor (not shown). The graphics processor may encode and scale the video data into a H.264 video stream at a resolution of 1280×720 with a data rate of 8 Mbps. The encoded and scaled video stream from the graphics processor may be transmitted to the processor 47, which stores the video stream in the media storage device 50.

According to one embodiment, the processor 47 may transmit the encoded and scaled video stream to the communications module 20, where the video stream is transmitted to another device for storage. Although storage and streaming of the video are discussed separately above, the processes may operate simultaneously, such that the video is streamed through the communications module 20 and stored in the media storage device 50 simultaneously.

The video and images may be stored in the media storage device 50 as AVI, JPEG, MPEG files, or in other suitable file formats by the smart EVSE 10. The processor 47 may upload the processed video to the server 27 through a wired or a wireless connection such as a 3G/4G/5G cellular data connection. Alternatively, a high-bandwidth wireless connection, such as WiFi may be established between the smart EVSE 10 and the server 27.

The smart EVSE 10 may further include a sensor 52 responsive to motion or user activation. The sensor 52 may be provided internally to the smart EVSE 10 or installed externally on the smart EVSE 10.

Consistent with one embodiment, the smart EVSE 10 may further include a short range communications module 55 for Bluetooth communications, a display screen 57 to interactively interact with the user and display a portion of the acquired camera or image data 22, a speaker 60 and a microphone 62 for audio communications and a touch screen or keyboard interface 65 for providing user interface functions.

The smart EVSE 10 may further include a payment module 67 that enables the user 37 to make a payment 70 for EVSE usage to charge an electric vehicle (EV) based on the acquired camera or image data 22. For example, the payment 70 may be done in US dollars for the kW/$ energy used by the electric vehicle (EV) for charging it or for a duration of charge time as $/hr. Other ways of payment are also possible.

The smart EVSE 10 may further include a transaction module 72 coupled to the payment module 67. The transaction module 72 may be configured to conduct monetary transactions through a billing center 75. The transaction module 72 enables verifying authorization for executing each transaction at the billing center 75.

The billing center 75 may be associated with at least one credit company of credit card of a user. The billing center 75 may be associated with one or more credit companies enabling to retrieve data from one or more databases. The billing center 75 retrieves data from a database (not shown) to check authorization of a transaction according to predefined authorization rules.

The payment module 67 may enable to authenticate the user 37 in each session. The authentication may be carried out by enabling a user to input details through mobile device 35 (e.g., pin code, user name and password etc.), where the input details may be authenticated by the payment module 67 based on the acquired camera or image data 22.

According to some embodiments, the smart EVSE 10 may use the networked on-charging station camera unit 12 as a biometric input device to acquire at least one biometric characteristic of the user 37 to enable identification of the user 37, where the payment module 67 enables authenticating the user 37 by biometric identification of the user 37 by searching through a biometric database (not shown) operatively associated with the payment module 67 to identify the inputted biometric characteristics.

The authentication of the user 37 may be carried out by, for example, enabling the user to input authentication details (e.g., code) and authenticating those details using a database including names and statuses of authorized users; by using biometric identification; and/or by using the mobile device's 35 ID (e.g., phone number or IP address) to automatically identify the user 37.

The smart EVSE 10 may further include an image analysis module 77 to analyze the acquired camera or image data 22 of the user 37 for identifying the user 37 by making a security or an identity determination. According to some embodiments, an image acquisition unit (not shown) of the image analysis module 77 may acquire an image of a credit card or a graphic image 79 (e.g., 3D code) on the mobile device 35, when the credit card or the mobile device 35 is placed in front of the built-in video camera 15 and/or the built-in still image camera 17 of the networked on-charging station camera unit 12.

The authentication of the user 37 may be carried out by checking a received image according to predefined rules and conditions by the image analysis module 77. The image analysis module 77 may analyze the received image (e.g. using OCR analysis technique) to identify the details of the credit card and/or the graphic image 79.

In the smart EVSE 10, the built-in video camera 15 and/or the built-in still image camera 17 may be configured to read the graphic image 79 from the mobile device 35 of the user 37 of the smart EVSE 10 to make a payment authentication. For example, the graphic image 79 may be a 3D authentication code with encoded authentication information. A 3D QR code or 3D barcode can be used in some embodiments of the present invention. 3D barcodes may be read by using the differences in height between the bars and spaces. This is different from 1D or 2D barcodes that are read by their contrast.

For additional fraud prevention, 3D secure authentication may be used. The 3D secure authentication stands for 3 Domain Server as there are 3 parties that are involved in the 3D secure process: the company the purchase is being made from, the Acquiring Bank (the bank of the company) and VISA® and MasterCard® (the card issuers themselves). This scheme is a collective of Verified by VISA® (VBV) and MasterCard® Secure Code (MSC). After one enters credit card details, a new window will appear, requesting a personal security code. The financial institution will authenticate the transaction within seconds, as well as confirm that one is the individual who is making the purchase. If one hasn't yet registered with Verified by VISA® or MasterCard® SecureCode, one'll need to activate this feature first. One can do this during the payment process, or activate it in advance through the VISA® or MasterCard® website.

According to one embodiment of the present invention, the communication module 20 to transmit a still image or a live or previously stored streaming video from the built-in video camera 15 and/or the built-in still image camera 17 to a camera application (APP) 82 installed on the mobile device 35 for a security determination, a monitoring function, an identification analysis and/or a payment processing.

In operation, the communication module 20 may transmit an alert signal 80 to the camera APP 82 of an operator to cause the camera APP 82 to indicate that motion has been detected. The alert signal 80 may otherwise be transmitted to another camera application (APP) of a monitoring person, an infrastructure operation system, or a monitoring system.

Likewise, the communication module 20 may transmit the alert signal 80 to the server 27 of an operator 85 to indicate that motion has been detected. Alternatively, the communication module 20 may transmit a still image or a live or previously stored streaming video from the built-in video camera 15 and/or the built-in still image camera 17 to the server 27 for a security determination, a monitoring function, an identification analysis and/or a payment processing.

Accordingly, in one exemplary embodiment, a smart EVSE may be with integrated a camera that is connected to a server via a network that can receive authentication information from the network and store that information locally. The smart EVSE has an ability to compare authentication information previously received with information derived from a local camera regardless of the status of the communications network. The smart EVSE has an ability to store and report EVSE usage information via the communication network based on authentication information previously received with information derived from the local camera.

Figure 2:
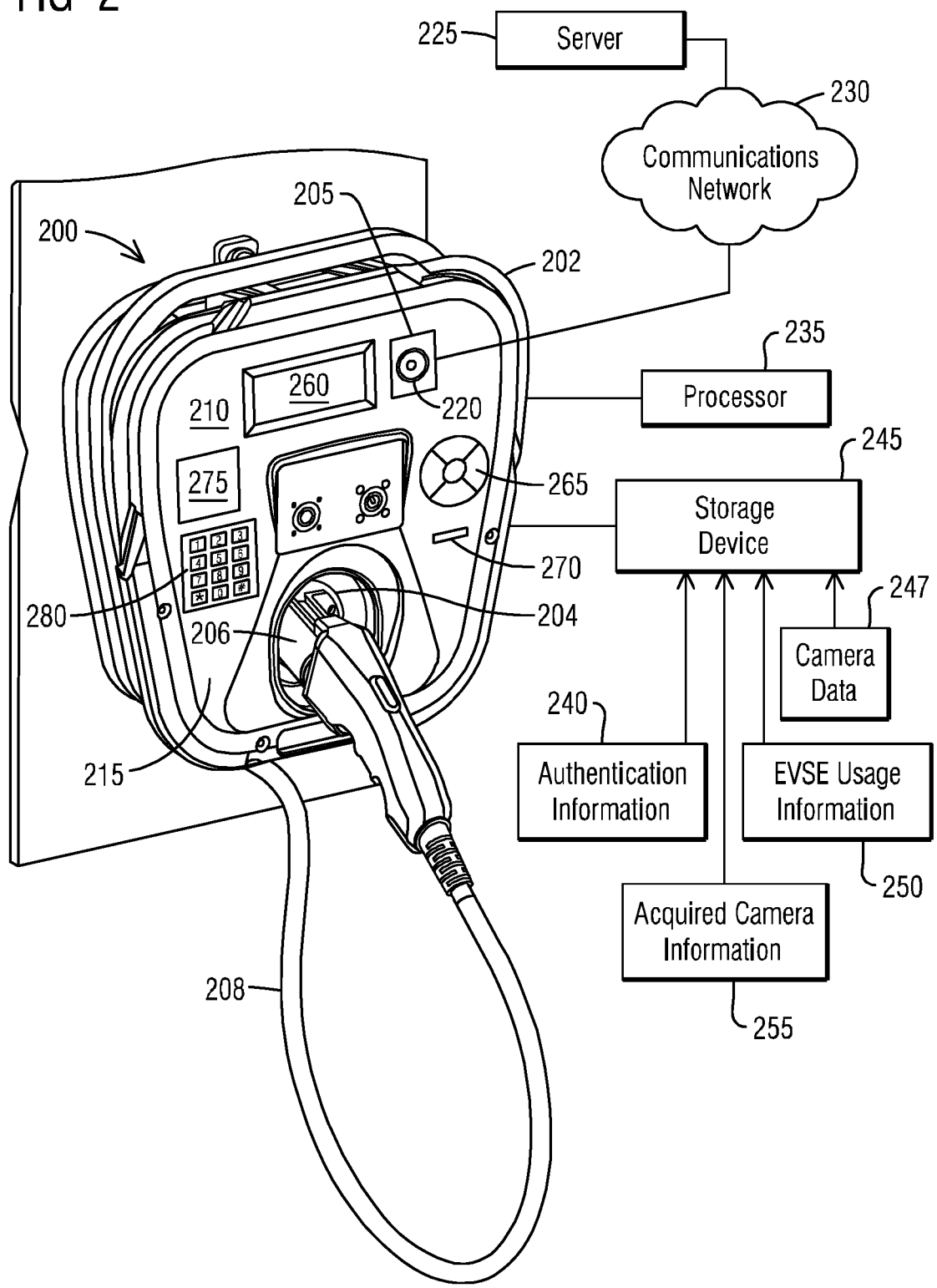
FIG. 2 illustrates a perspective view of a smart EVSE with a networked on-charging station camera unit in accordance with one illustrative embodiment of the present invention.

Referring to FIG. 2, it illustrates a perspective view of a smart EVSE 200 with a built-in camera unit 205 in accordance with one illustrative embodiment of the present invention. The smart EVSE 200 includes a housing 202 that contains the circuitry of the EVSE charging station. The housing 202 includes a holder 204 that supports a connector 206 when the smart EVSE 200 is not in use charging an EV. The connector 206 is electrically coupled to the smart EVSE 200 via a charging cable 208. The charging cable 208 enters the housing 202 at a lower edge of the housing 202.

The smart EVSE 200 comprises a body 210 having an exterior surface 215. The smart EVSE 200 includes the built-in camera unit 205 integrated with the body 210. The built-in camera unit 205 has a camera 220 disposed on the exterior surface 215. The camera 220 is communicatively coupled to a server 225 via a communications network 230.

In accordance with one illustrative embodiment of the present invention, the built-in camera unit 205 includes a processor 235 configured to receive authentication information 240 of a user of the smart EVSE 200 over the communications network 230. The built-in camera unit 205 further includes a storage device 245 configured to store, camera data 247, the authentication information 240 locally at the smart EVSE 200 and store EVSE usage information 250. The camera data 247 may include digital photos or digital video files. The EVSE usage information 250 may include a specific time when the smart EVSE 200 is used and an amount of energy used at the specific time.

The processor 235 may be configured to compare the stored authentication information 240 with information acquired from camera 255 to ascertain an identity of the user of the smart EVSE 200. The information acquired from camera 255 may be extracted from the camera data 247. Examples of the information acquired from camera 255 include user identification information, payment authentication information, security monitoring information etc.

The processor 235 may further be configured to report the EVSE usage information 250 via the communications network 230 based on the stored authentication information 240 and the information acquired from camera 255.

Consistent with one embodiment, the smart EVSE 200 may further include a display screen 260 to interactively interact with the user and display a portion of the camera data 247, a speaker 265 and a microphone 270 for audio communications, a touch screen 275 and a keyboard interface 280 for providing user interface functions.

The smart EVSE 200 with the integrated camera 220 may include local storage and/or a communication module. Thus, images and video may be recorded and stored for download to another device later. Additionally, images and video may be streamed from the integrated camera in the smart EVSE 200 to another location, such as a mobile phone or a server, where the images and video may be processed or stored.

Electronic components, such as a communication module, a video recorder, a processor, a graphics processor, a memory, and a data storage port may be coupled and/or attached to a circuit board of the smart EVSE 200. According to one embodiment, several of the electronic components may be integrated into a system-on-chip (SoC). For example, the graphics processor, the processor, and the memory may be contained on a single SoC coupled and/or attached to the circuit board.

It should be appreciated that several other components may be included in the smart EVSE 200. However, the function and use of such equipment for a charging station electronics application are well known in the art and are not discussed further.

The built-in camera unit 205 may be a camera and a computer combined in one intelligent unit. The built-in camera unit 205 is configured to capture and send stored or live video directly over an Internet Protocol (IP) Network such as a Local Area Network (LAN), intranet or the Internet and enables users to view and/or manage the camera using a standard web-browser or video management software on a local or remote computer on a network. The built-in camera unit 205 allows authorized viewers from different locations to simultaneously access images from the same network camera.

The smart EVSE 200 may provide common operating system (OS) functions like a desktop computer OS functions. This OS may enable security logging, data storage, data authentication, user troubleshooting, date/time synchronization, data transfer management, and a platform from which a camera system operates. Two operating systems appropriate for use in embodiments of the present invention are Windows® and Linux®. Either of the operating systems can be embedded into the smart EVSE 200.

By the built-in camera unit 205 a motion may be detected within a field of view of the camera 220 such as the built-in video camera 15 and/or the built-in still image camera 17. This data is then used to notify a user, or trigger a sequence of events. For example, when motion is sensed, the built-in camera unit 205 is programmed to take a picture of the area under view and have it saved for later viewing.

The built-in camera unit 205 can also be programmed to transmit streaming video. Preferably, the built-in camera unit 205 is sensitive to infra-red light.

The detection of motion by the built-in camera unit 205 may be used to cause a snapshot to be taken of the front area of the smart EVSE 200. In contrast, an embodiment of the present invention uses a combination infrared illuminator and a camera to detect motion in a field of view.

Once the processor 235 has determined that motion exists, it may then initiate any of the following exemplary procedures: notify a remote server or a mobile device using a radio link, take a snapshot (freeze) picture of the area under view and/or turn on a communication module to display live motion video.

Figure 3:
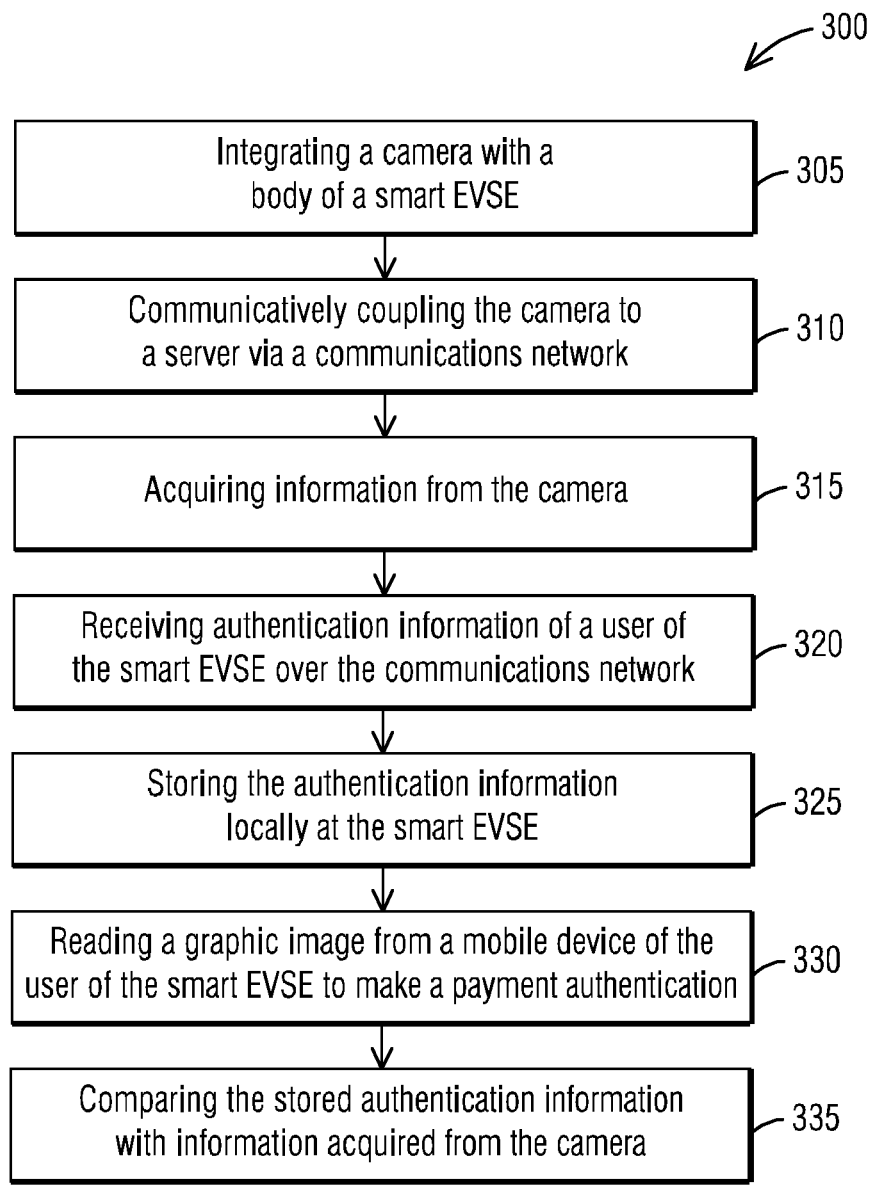
FIG. 3 illustrates a flow chart of a method of integrating a camera with a body of a smart Electric Vehicle Supply Equipment (EVSE) in accordance with an exemplary embodiment of the present invention.

Turning now to FIG. 3, it illustrates a flow chart of a method 300 of integrating the camera 220 with the body 210 of the smart Electric Vehicle Supply Equipment (EVSE) 200 in accordance with an exemplary embodiment of the present invention. Reference is made to the elements and features described in FIGS. 1-2. It should be appreciated that some steps are not required to be performed in any particular order, and that some steps are optional.

In step 305, the camera 220 may be integrated with the body 210 of the smart Electric Vehicle Supply Equipment (EVSE) 200 as an internally built-in camera or an externally installed on-charging station camera. The camera 220 may be communicatively coupled to the server 225 via the communications network 230 in step 310.

In step 315, the processor 235 may acquire information from the camera 220. The processor 235 may receive the authentication information 240 of a user of the smart EVSE 200 over the communications network 230 at step 320. The processor 235 may store the authentication information 240 locally at the smart EVSE 200 in the storage device 245 at step 325. In step 330, the processor 235 may read the graphic image 79 from the mobile device 35 of the user 37 of the smart EVSE 200 to make a payment authentication. The graphic image may be affixed on a vehicle of the user also. For example, a graphic image may be affixed on a license tag plate of the vehicle.

For instance, a payment may be either prearranged or a payment interface may be on the users' mobile device 35. The payment authentication may be made by the user 37 holding his mobile device 35 (with a 3D code) in front of the smart EVSE 200 and a camera of the smart EVSE 200 would read the 3D code.

In step 335, the processor 235 may compare the stored authentication information 240 with the information acquired from camera 255 to ascertain an identity of the user of the smart EVSE 200. Based on the user identity determination, a payment authentication may be done for a service of providing charge by the smart EVSE 200 to an electric vehicle of a user at a parking lot or a public charging station.

The mobile device 35 may include one or more software applications for performing the method described in FIG. 3. For example, when the mobile device 35 is a cellular phone, an application may be available for the cellular phone to control the networked on-charging station camera unit 12 of FIG. 1. The application may include an interface for selecting a video quality of the built-in video camera 15 and/or the built-in still image camera 17, selecting a server for uploading video from the built-in video camera 15 and/or the built-in still image camera 17, activating and deactivating the built-in video camera 15 and/or the built-in still image camera 17, programming a scheduled time for activating and deactivating the built-in video camera 15 and/or the built-in still image camera 17, selecting options for processing video received from the built-in video camera 15 and/or the built-in still image camera 17, selecting options for processing of the video by electronic components in the networked on-charging station camera unit 12 before transferring the video to the mobile device 35, and/or a selecting streaming or local storage mode for the networked on-charging station camera unit 12. Alternatively, these described functionalities can be performed via the server 27.

Figure 4:
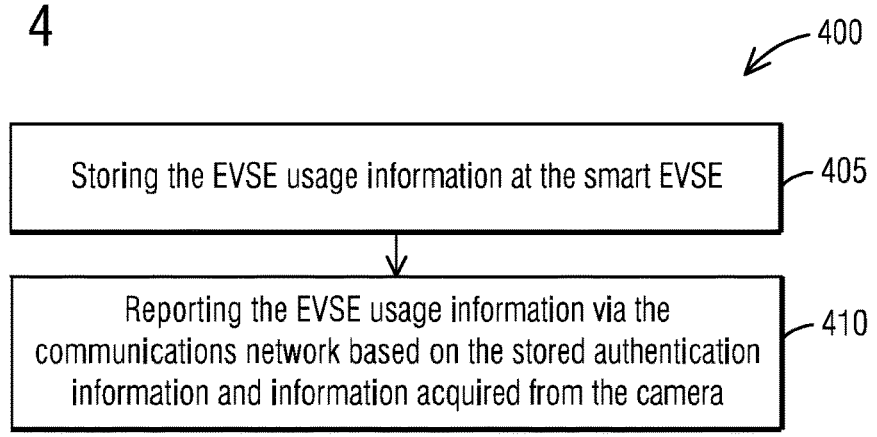
FIG. 4 illustrates a flow chart of a method of storing and reporting EVSE usage information in accordance with one illustrative embodiment of the present invention.

FIG. 4 illustrates a flow chart of a method 400 of storing and reporting the EVSE usage information 250 in accordance with one illustrative embodiment of the present invention. Reference is made to the elements and features described in FIGS. 1-2. It should be appreciated that some steps are not required to be performed in any particular order, and that some steps are optional.

The method 400 includes storing the EVSE usage information 250 including a specific time when the smart EVSE is used and an amount of energy used at the specific time in the storage device 245 for use by the processor 235 at step 405. In step 410, the EVSE usage information 250 may be reported by the processor 235 to the server 225 via the communications network 230 based on the stored authentication information 240 and the information acquired from camera 255.

FIG. 5 illustrates a schematic diagram of an enclosure 500 that is tamper resistant. The enclosure 500 is configured to house a camera 505 on a frontal end 510 of a smart EVSE 515 in accordance with one illustrative embodiment of the present invention. The enclosure 500 is configured to provide a periscope arrangement using a high-resolution mirror 520 to enable the flexibility of the camera 505 positioning. Since the camera 505 is inaccessible from outside and away from a direct contact, the enclosure 500 acts as an anti-tamper configuration.

Embodiments of the present invention can be integrated into currently deployed electric vehicle charging stations, allowing for operators to retrofit electric vehicle charging stations with a camera. Embodiments of the present invention will allow electric vehicle charging stations owners to charge for services in a safe and secure environment without deploying additional equipment. With known installation methods, the embodiments of the present invention may provide a retrofit solution, requiring no removal of installed electric vehicle charging stations. Embodiments of the present invention may increase the overall safety and functionality of operations of electric vehicle charging stations.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A smart Electric Vehicle Supply Equipment (EVSE), the smart EVSE comprising: a networked on-charging station camera unit disposed either internally to the smart EVSE or connected externally on the smart EVSE, the camera unit including at least one of a video camera and a still image camera to acquire camera data; and a processor coupled to the camera unit, the processor is configured to: (i) communicate the acquired camera data over a camera connection as private communications to a server over a Local Area Network or a mobile device of a user over a cellular network, wherein the camera unit is configured to read a graphic image from the mobile device of the user of the smart EVSE or a graphic image affixed on a vehicle of the user to make a payment authentication, wherein the graphic image is an authentication code with encoded authentication information, wherein the payment authentication is carried out by enabling the user to input details through mobile device such that the input details are authenticated based on the acquired camera data of the graphic image, (ii) communicate the acquired camera data to the server or the mobile device of the user over a public network infrastructure by connecting to Internet or a networked communications system, wherein the camera unit is configured to read a graphic image from the mobile device of the user of the smart EVSE or a graphic image affixed on a vehicle of the user to make a payment authentication, wherein the graphic image is an authentication code with encoded authentication information, wherein the payment authentication is carried out by enabling the user to input details through mobile device such that the input details are authenticated based on the acquired camera data of the graphic image, or (iii) communicate the acquired camera data to the server or the mobile device of the user over a combination of one or more public networks and one or more private networks, wherein the camera unit is configured to read a graphic image from the mobile device of the user of the smart EVSE or a graphic image affixed on a vehicle of the user to make a payment authentication, wherein the graphic image is an authentication code with encoded authentication information, wherein the payment authentication is carried out by enabling the user to input details through mobile device such that the input details are authenticated based on the acquired camera data of the graphic image.

2. The smart EVSE of claim 1, wherein the processor is configured to enable a user to make a payment based on the acquired camera data and the processor is configured to conduct monetary transactions through a billing center, wherein the processor enables verifying authorization for executing each transaction at the billing center.

3. The smart EVSE of claim 1, wherein the processor is configured to analyze the acquired camera data of a user for identifying the user by making a security or an identity determination.

4. The smart EVSE of claim 1, further comprising: an enclosure that is tamper resistant, the enclosure to house the at least one of a video camera and a still image camera of the camera unit.

5. The smart EVSE of claim 1, wherein the camera unit is operable to capture, store, transmit video and still images and provide image data for the video and still images to the processor.

6. The smart EVSE of claim 5, wherein the processor to detect motion from the image data.

7. The smart EVSE of claim 6, wherein the processor to transmit an alert signal to a camera application (APP) installed on a mobile device of an operator to cause the camera APP to indicate that motion has been detected, a camera application (APP) of a monitoring person, an infrastructure operation system, or a monitoring system.

8. The smart EVSE of claim 7, wherein the processor to transmit a still image or a live or previously stored streaming video from the at least one of a video camera and a still image camera to the camera APP for at least one of a security determination, a monitoring function, an identification analysis and a payment processing.

9. The smart EVSE of claim 5, wherein the processor to transmit an alert signal to the server of an operator to indicate that motion has been detected.

10. The smart EVSE of claim 5, wherein the processor to transmit a still image or a live or previously stored streaming video from the at least one of a video camera and a still image camera to the server for at least one of a security determination, a monitoring function, an identification analysis and a payment processing.

11. The smart EVSE of claim 1, further comprising: a short range communications module; a display screen to interactively interact with the user and display a portion of the acquired camera data; a speaker and a microphone for audio communications; and a touch screen or keyboard interface for providing user interface functions.

12. The smart EVSE of claim 1, further comprising: a sensor responsive to motion or user activation, wherein the sensor is provided internally to the smart EVSE or installed externally on the smart EVSE.

13. The smart EVSE of claim 1, further comprising: a media storage device to store the acquired camera data and store EVSE usage information including a specific time when the smart EVSE is used and an amount of energy used at the specific time.

14. A smart Electric Vehicle Supply Equipment (EVSE), the smart EVSE comprising:
  a body having an exterior surface;
  and a camera unit integrated with the body, the camera unit having a camera disposed on the exterior surface, the camera is communicatively coupled to a server via a communications network, wherein the camera unit including:
  a processor configured to receive authentication information of a user of the smart EVSE over the communications network, and
  a storage device configured to store the authentication information locally at the smart EVSE and store EVSE usage information,
  wherein the processor is configured to compare the stored authentication information with information acquired from the camera to ascertain an identity of the user of the smart EVSE,
  wherein the camera is configured to read a graphic image from a mobile device of a user of the smart EVSE or a graphic image affixed on a vehicle of the user to make a payment authentication wherein the graphic image is an authentication code with encoded authentication information,
  and wherein the payment authentication is carried out by enabling the user to input details through mobile device such that the input details are authenticated based on the acquired camera data of the graphic image.

15. The smart EVSE of claim 14, wherein the processor is further configured to report the EVSE usage information via the communications network based on the stored authentication information and the information acquired from the camera, wherein the EVSE usage information including a specific time when the smart EVSE is used and an amount of energy used at the specific time.

16. The smart EVSE of claim 14, wherein the graphic image is a 3 D authentication code.

* * * * *